No. 626,384. Patented June 6, 1899.
L. DE F. JENNINGS.
ACETYLENE GAS GENERATOR.
(Application filed Jan. 25, 1899.)
(No Model.) 3 Sheets—Sheet 1.
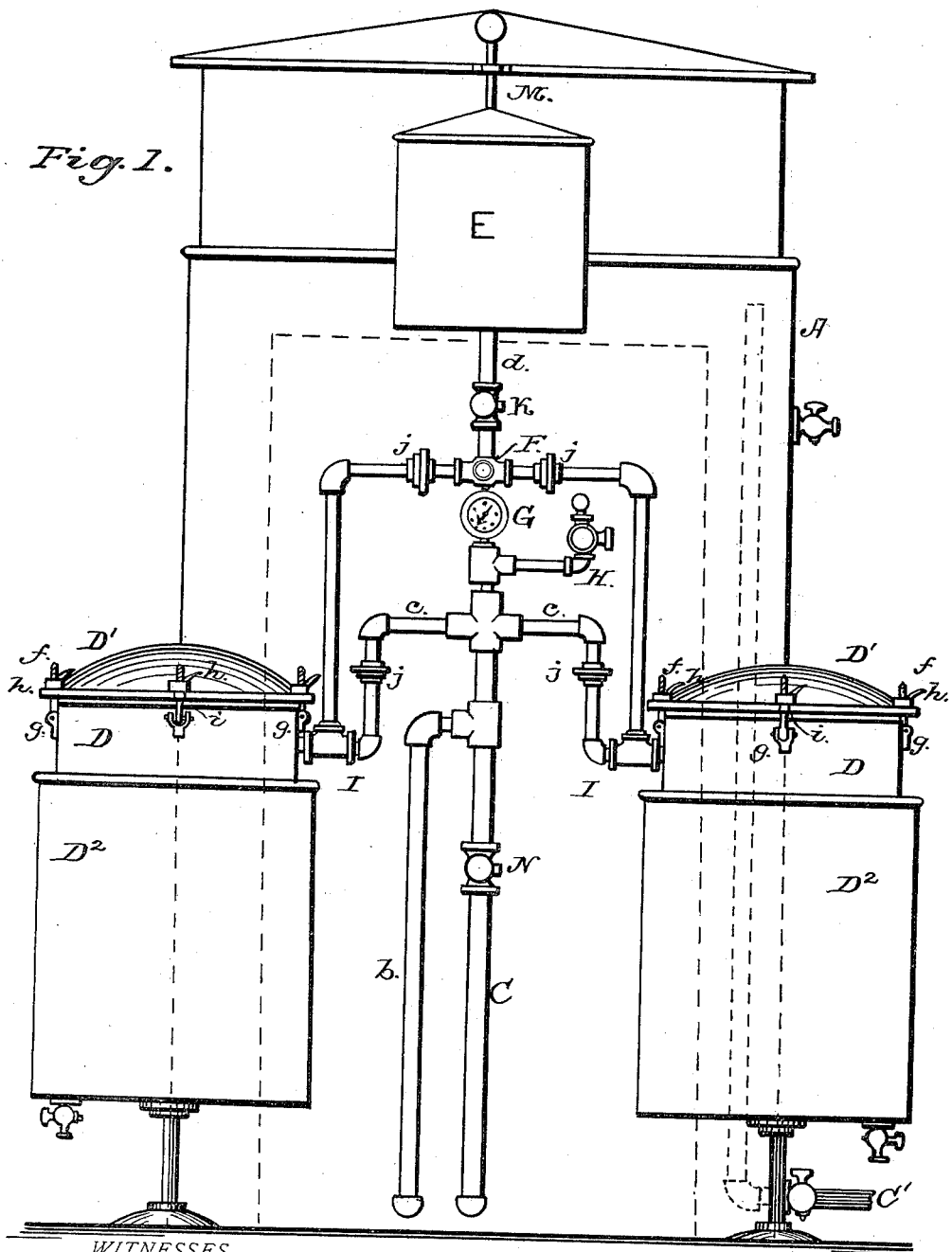

No. 626,384. Patented June 6, 1899.
L. DE F. JENNINGS.
ACETYLENE GAS GENERATOR.
(Application filed Jan. 25, 1899.)
(No Model.) 3 Sheets—Sheet 2.
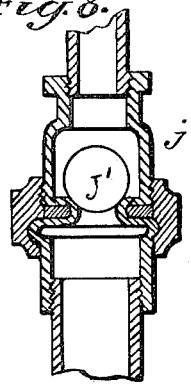
Fig. 8.
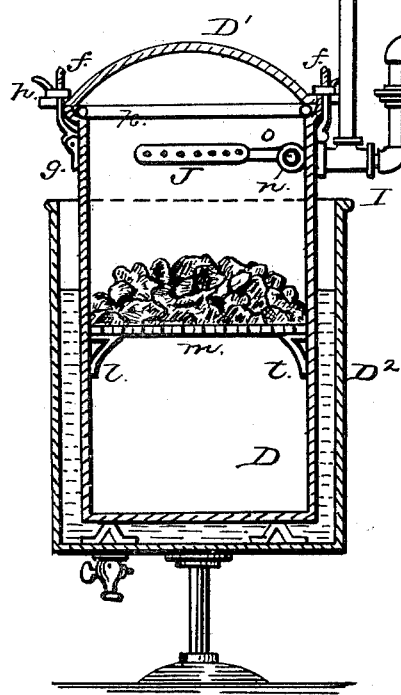
Fig. 2.
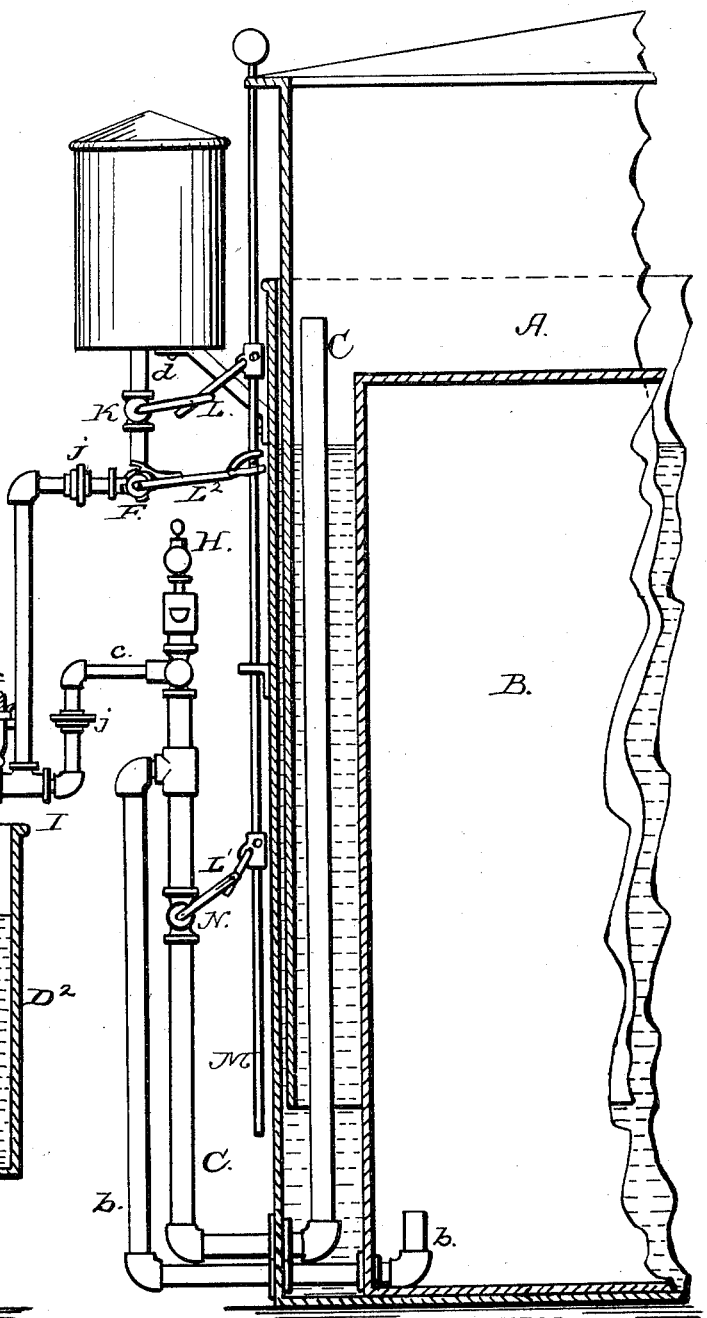
WITNESSES
Arthur R. Colburn
INVENTOR
Linson de Forrest Jennings.
By Parker K. Sweet Jr.
Attorney No. 626,384. Patented June 6, 1899.
L. DE F. JENNINGS.
ACETYLENE GAS GENERATOR.
(Application filed Jan. 25, 1899.)
(No Model.) 3 Sheets—Sheet 3.
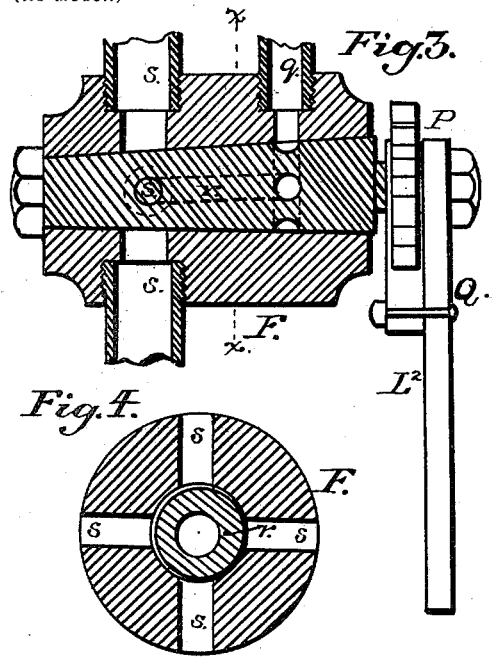
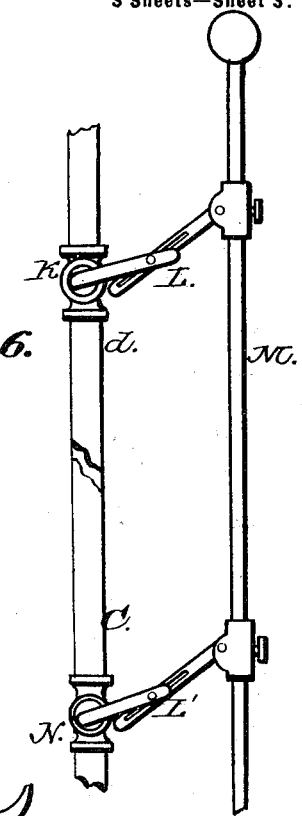
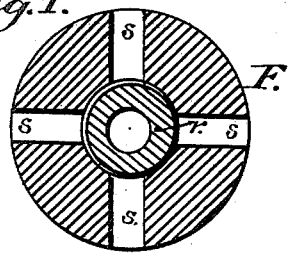
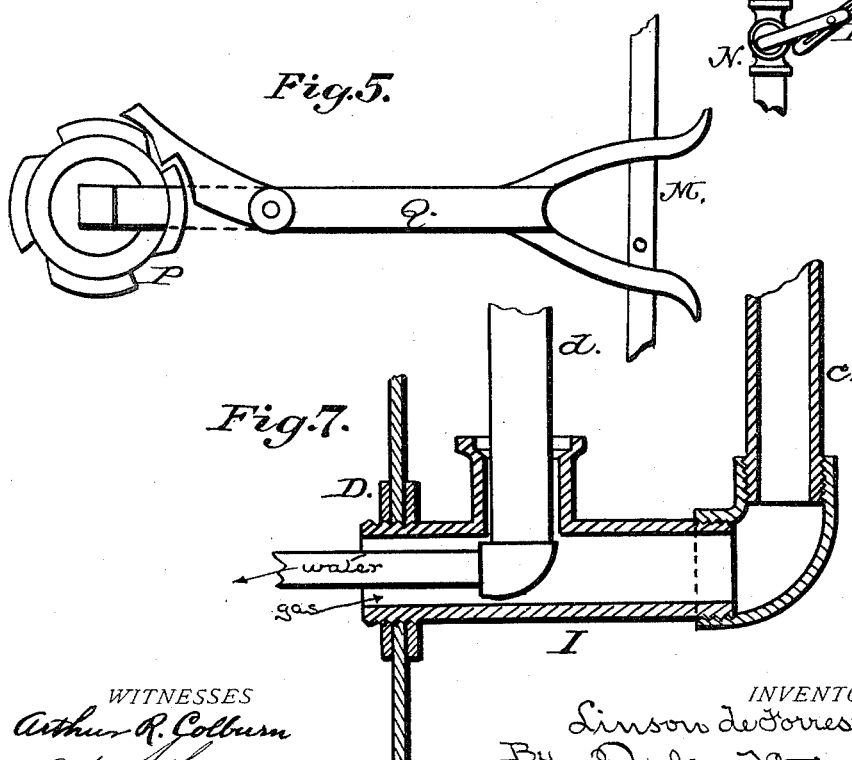
WITNESSES
Arthur R. Colburn
INVENTOR
Linson de Forrest Jennings.
By Parker & Sweet
Attorney
THE NORRIS PETERS CO., PHOTO-LITHO., WASHINGTON, D. C.

UNITED STATES PATENT OFFICE.

LINSON DE FOREST JENNINGS, OF CHAUTAUQUA, NEW YORK, ASSIGNOR OF ONE-THIRD TO EGBERT A. PITKIN, OF WASHINGTON, DISTRICT OF COLUMBIA.

ACETYLENE-GAS GENERATOR.

SPECIFICATION forming part of Letters Patent No. 626,384, dated June 6, 1899.

Application filed January 25, 1899. Serial No. 703,393. (No model.)

*To all whom it may concern:*

Be it known that I, LINSON DE FOREST JENNINGS, a citizen of the United States, and a resident of Chautauqua, in the county of Chautauqua and State of New York, have invented new and useful Improvements in Hydrocarbon-Gas Apparatus; and I do hereby declare the following to be a full, clear, and exact description of said invention, reference being had to the accompanying drawings, and to the letters of reference marked thereon, which form a part of this specification.

My invention relates to improvements in that class of apparatus generally employed for the manufacture of combustible gas and wherein the mixing together of two combining materials produces by their chemical action a resultant gas, my improved apparatus being designed more particularly for the production of hydrocarbon gas by bringing together calcium carbid and water.

The object of my invention is to provide an apparatus of novel construction in which the supply of water to the carbid chambers or generators to produce gas is automatically governed by the production of a determined amount of gas generated and conveyed to the gasometer and its storage-tank, said gasometer, in connection with certain valves and attendant levers acting therewith, not only regulating the supply of water, but also the desired production, volume, and supply of gas to the point of consumption.

To the above ends my invention consists, essentially, of the novel details of construction and general arrangement of parts, as will be hereinafter more fully described, and pointed out in the claims.

In the accompanying drawings, forming a part of this specification, Figure 1 represents a front elevation of my complete apparatus; Fig. 2, a vertical longitudinal section thereof; Fig. 3, a detail view of the side rod and valve-levers; Figs. 4, 5, and 6, detail views of the switch-valve, and Fig. 7 a detail sectional view of the device for feeding water and allowing gas to pass out to the gasometer and storage-tank through one opening in the wall of the generator.

Similar letters of reference occurring on the several figures indicate corresponding parts.

As will be seen from the drawings, the usual gasometer A is provided with a storage-tank B, located within the lower central part of the same and surrounded by a water seal, a suitable pipe $b$ leading from the bottom of said storage-tank to the main gas-pipe C, with which is connected the gas-pipes $c$ from the generators D. A pipe $d$ leads from the water supply or tank E to the switch-valve F, whereby the water is fed intermittently and automatically to the generators in the manner hereinafter more fully described.

The upper part of the main gas-pipe C is provided with a suitable gage G and with a safety-valve H, arranged to blow off at a given pressure. The generators D are preferably constructed of sheet-steel suitably riveted and soldered to secure great strength and provided with a cover D', adapted to be hermetically sealed in position by means of locking-clamps $f$, arranged around the periphery of said cover in suitable numbers to effect a close and even joint between the cover and body of the generator. As shown in the drawings, these locking-clamps are pivoted to projections $g$ near the upper part of the generator, and the free ends of said clamps, being screw-threaded for the reception of hand-screws $h$, engage with open slots $i$, formed at regular and corresponding intervals upon the slightly-projecting rim of the cover. A suitable rubber gasket $k$ is interposed between the upper part or mouth of the generator and its cover, thereby providing an air-tight joint when the generator is in use. By means of this improved construction the cover D' is rendered capable of being readily and easily removed or replaced in position.

Each of the generators D is adapted to be suitably suspended in a somewhat larger receptacle $D^2$, the intervening space at the sides and bottom being filled with water, as shown. Midway in each generator are provided lugs or projections $l$ for the reception and support of the grate or screen $m$, which carries the charge of calcium carbid. A single pipe-opening is formed in the wall of each generator for the reception of the compound coupling I, having a branch of the main water-pipe $d$ passing through the center of the same in such manner as to allow the water to be sprayed upon the carbid and the resultant gas caused thereby to pass out through the compound coupling I into a branch of the main gas-pipe C and from thence into the gasometer or storage-tank. The outer end of the compound coupling is provided with a bushing for the reception of the water-pipe, as also to prevent the escape of gas at that point. The water-pipe leading through said compound coupling and projecting a short distance only into the generator is provided with a swing-joint or coupling $n$, to which is connected a short section of pipe $o$, carrying the spider water drip or nozzle J, the object of the swing-joint being to permit of the ready elevation of said drip or nozzle when it becomes necessary to recharge the generator or to clean the same.

The branch gas-pipe $c$, projecting from each generator, is connected to the main gas-pipe C by suitable unions or couplings $j$, provided with check-valves $j'$, to allow passage of the gas from the generator to the main gas-pipe, but preventing its passage in the opposite direction, and the branch water pipe or pipes are connected to the main water-pipe $d$ in a similar manner and also provided with check-valves to permit of the passage of the water in one direction only—that is, to the generator—as fully shown in Fig. 1 of the drawings.

Upon the main water-pipe $d$ is provided a valve K, adapted to be operated by the lever L, adjustably attached to the slide-rod M, having its upper end secured at a suitable point to the top or bell of the gasometer, whereby the alternate rising or falling of the said gasometer serves to operate said valve K to automatically feed or cut off the supply of water to the generators. A similar valve N is located upon the main gas-pipe C just below the point where the gas-pipe $b$ from the storage-tank is connected therewith, and this valve is adapted to be operated in a like manner as that of the water-valve K by a lever L', adjustably attached to the slide-rod M, and whereby the pressure of gas from the generators is automatically directed into either the gasometer or the storage-tank, according to the conditions prevailing.

The switch-valve F is located at the point of the union of the main water-pipe $d$ with one or more branches, according to the number of generators used. This valve is provided with one water-inlet $q$, arranged in one side of the wall of the valve and communicating with an open passage $r$, running at right angles thereto, in the valve proper, which passage is so arranged as to come into juxtaposition successively with one or more outlets $s$, leading to the feed-water pipes of the generators. One end of the valve is provided with a notched disk P, rigidly secured thereto, the number of notches corresponding to the number of water-outlets used. A spring-actuated pawl or clutch Q engages successively with these notches to change the direction of the flow of water from one outlet to another, and consequently feed one generator after another, according to the requirements of producing the desired quantity of gas. The outer end or arm of the pawl or clutch Q is adapted to be operated by a suitable lever $L^2$, also adjustably attached to the slide-rod M of the gasometer, thereby providing for the automatic and necessary supply of water to one generator after another during the operation of producing the gas.

The main gas-pipe C passes through the wall of the gasometer at or near the bottom and thence upwardly through the water seal to a determined point above the same to inflate said gasometer with the gas formed in the generators, an outlet-pipe C', of equal height to that of the inlet-pipe C, being located at a suitable point within the gasometer and passing out to one side near the bottom thereof for carrying off the accumulated gas to the point of consumption.

The construction of my improved apparatus being as hereinbefore described, it may be observed that in the operation of the same one or more generators are charged with calcium carbid and the water and gas valves, as also the switch-valve, then arranged for operation by adjusting their respective levers at the proper points upon the slide-rod M of the gasometer. The water being then turned on, passes down the main pipe $d$ into one of the branch pipes and from thence into the generator, where it is sprayed upon the charge of carbid. The resultant gas at once passes out through the compound coupling I into the branch gas-pipe $c$ of the generator and from thence through the main gas-pipe C to the gasometer, causing the crown or bell to gradually rise until the gasometer is filled to a predetermined point or until the charge of carbid in the first generator is exhausted, and while at this point the lever of the switch-valve F, operated by the slide-rod M, moving downward with the crown or bell of the gasometer as the gas is consumed through the outlet-pipe C', causes the clutch or pawl Q to direct the flow of water to the next succeeding outlet and from thence to another freshly-charged generator, the resultant gas therefrom passing in the usual course through the main gas-pipe C to the gasometer, and in the event of the gas in the same not being drawn to the point of consumption then the gas-valve N in the main gas-pipe C is turned in such direction by the lever L' on the slide-rod M by the still upward movement of the crown or bell as to deflect the current of gas through the pipe $b$ into the storage-tank within the said gasometer. At such point, where the gasometer acquires its highest point, or nearly so, and the storage-tank being fully charged, the lever L on the slide-rod M turns the water-valve K to cut off the supply of water to prevent the further production of gas. As the gas is drawn off by means of the outlet-pipe C' and consumed the downward movement of the crown or bell reverses the valves and again turns on the water through the medium of the slide-rod M and water-valve K to one of the generators, and the production of the gas again goes on. In case no further generation of gas is desired or the charge of carbid in the generator or generators becomes exhausted the still further downward movement of the crown or bell of the gasometer turns the gas-valve N through the medium of the slide-rod M and the lever L' back to its normal position, causing the gas in the storage-tank to flow out through the gas-pipe $b$ to the main gas-pipe C and from thence to the gasometer for consumption through the outlet-pipe C'.

Having thus described my invention, I claim as new and useful and desire to secure by Letters Patent—

1. An apparatus for producing hydrocarbon gas, comprising a gasometer, a storage-tank located within the same, a series of generators having gas-pipes leading therefrom to the main gas-pipe projecting into the gasometer; said main gas-pipe being provided with a branch pipe which projects into the storage-tank, water-pipes connecting the water-tank and the generators, check-valves arranged in branch gas and water pipes, and switch-valves arranged in main gas and water pipes, and means for operating the same in connection with a slide-rod attached to the bell or crown of the gasometer, the several parts being arranged and combined for operation, substantially as specified.

2. In an apparatus for producing hydrocarbon gas, a gasometer having a storage-tank located within the same; said gasometer having an outlet supply-pipe, and an inlet-pipe connecting with the gas-pipes of a series of generators, and provided with a pressure-gage and safety-valve and with a branch pipe projecting into the storage-tank, the water-pipes connecting the water-supply and said generators, check-valves upon the branch gas and water pipes, and the switch-valves in main inlet gas-pipe and the water-supply pipe arranged for operation in connection with the levers and the slide-rod upon the bell or crown of the gasometer, all combined and arranged for operation, substantially as specified.

3. In an apparatus for producing hydrocarbon gas, the gas-pipes $b$ and C arranged as described; said pipe C being provided with valve N, gage G, safety-valve H, branch pipes $c$, compound coupling I and water sprayer or nozzle J having swing-joint $o$, in combination with the generators D, gasometer A, storage-tank B and water-supply pipe $d$ provided with water-valve K and switch-valve F, and the slide-rod M having adjustable levers L, L' and L², substantially as and for the purpose specified.

4. In an apparatus for producing hydrocarbon gas, the main gas-pipe having the branch pipe, arranged as described; said main pipe being provided with a switch-valve, pressure-gage and safety-valve, and connecting with the gas-pipes from the generators, compound coupling for water and gas pipes, and the water spray or nozzle having a swing-joint, in combination with the generators, gasometer, storage-tank, and the water and gas pipes provided with switch and check valves arranged for operation in connection with levers and slide-rod, substantially as specified.

5. In an apparatus for producing hydrocarbon gas, a gasometer having a storage-tank located within the same, a series of generators having gas-pipes leading therefrom to the main gas-pipe projecting into the gasometer, and with water-pipes leading from the main water-pipe of the water-tank, a branch pipe of the main gas-pipe projecting into the storage-tank, the switch-valves on main gas and water pipes, and the check-valves on branch gas and water pipes, whereby the equalization of gas in gasometer and storage-tank is prevented, substantially as specified.

6. In an apparatus for producing hydrocarbon gas, a gasometer provided with a storage-tank located within the central lower portion thereof, in combination with a series of generators, having branch gas-pipes connecting with main gas-pipe leading into the gasometer, and with branch pipe from main gas-pipe leading into the storage-tank, water-pipes connecting said generators and the water-supply, the check-valves in branch gas and water pipes, and switch-valves on main gas and water pipes arranged for operation in connection with levers and the slide-rod upon the bell or crown of the gasometer, substantially as specified.

In testimony whereof I affix my signature in presence of two subscribing witnesses.

LINSON DE FOREST JENNINGS.

Witnesses:
F. H. FLANDERS,
R. D. CASSELMAN.